United States Patent [19]
Hoffman et al.

[11] Patent Number: 5,597,010
[45] Date of Patent: Jan. 28, 1997

[54] SAFETY CAP FOR FLUID VALVE

[76] Inventors: John W. Hoffman, P.O. Box 951195, Lake Mary, Fla. 32795; Curtis W. Hoffman, 111 Maplewood Dr., Sanford, Fla. 32771

[21] Appl. No.: 525,828

[22] Filed: Sep. 8, 1995

[51] Int. Cl.$^6$ ............................................. F16K 27/08
[52] U.S. Cl. ............................ 137/381; 137/382; 137/327
[58] Field of Search ................................ 137/377, 381, 137/382, 327

[56] References Cited

U.S. PATENT DOCUMENTS

| | | | |
|---|---|---|---|
| 1,827,574 | 10/1931 | Frazier | 137/382 |
| 3,175,573 | 3/1965 | Vater | 137/382 |
| 4,762,144 | 8/1988 | Ford | 137/377 |
| 4,842,443 | 6/1989 | Agandona | 137/381 |
| 4,955,404 | 9/1990 | Pitzen | 137/377 |

FOREIGN PATENT DOCUMENTS 435843  9/1935  United Kingdom .................. 137/381

Primary Examiner—A. Michael Chambers
Attorney, Agent, or Firm—Allen, Dyer, Doppelt, Franjola & Milbrath, P.A.

[57] ABSTRACT

A safety cap for preventing unauthorized access to a refrigerant valve is described. The safety cap has a locking piece that attaches to the valve's threaded portion and covers the valve's access port. A collar surrounds the locking piece and is mechanically decoupled therefrom, so that motion is not communicated therebetween. The locking piece has a topographic feature such as a number of asymmetrically placed holes. A special releasing tool that has complementary protrusions for interfacing with the holes is required in order to decouple the locking piece from the valve.

14 Claims, 2 Drawing Sheets

SAFETY CAP FOR FLUID VALVE

BACKGROUND OF THE INVENTION

1. Field of the Invention

The present invention relates to safety caps for valves, and, more particularly, to safety caps for a fluid refrigerant.

2. Description of Related Art

It has become increasingly important to secure valves that are designed to provide access to a fluid, in particular, to gases, in a storage vessel.

The valves used at present are easily tampered with by unauthorized people who wish to remove the fluid from the vessel. A specific and relatively recent problem has been the removal of refrigerant gases, which are typically stored or pass through a unit situated outside a building and are thus readily accessible.

Release of refrigerant gases such as chlorofluorocarbons is a twofold problem: First, if the gas is inhaled by a person desiring an intoxicating effect, physiological damage can occur; second, a release of the gas into the atmosphere is deleterious to the environment through its role in the destruction of the ozone layer.

SUMMARY OF THE INVENTION

It is therefore an object of the invention to provide a device for preventing access to a valve.

It is an additional object to provide such a device for increasing the safety of storing and handling harmful gases.

It is a further object to provide such a device for preventing the unintentional leakage of harmful gases from a vessel into the environment during unauthorized access of the vessel.

The device of the present invention is a safety cap for preventing unauthorized access to a valve leading to a fluid storage vessel. The safety cap comprises a collar and a locking piece that are adapted to cover the access port of the valve and to be extremely difficult to remove without a specially created releasing tool.

The collar has means for retaining the collar in surrounding relation to the access port of the valve. In a particular embodiment wherein the valve is connected to a fluid line via a coupler that is generally larger than the valve body, the retaining is accomplished by dimensioning the bottom end of the collar bore sufficiently small that the collar cannot pass beyond the coupler.

The collar also has a bore that is dimensioned to encompass the valve access port and further has a height dimensioned to extend above it.

The locking piece is dimensioned to cover the valve access port and also to reside within the collar bore. The relative dimensioning of the two elements permits the locking piece to be mechanically decoupled from the collar when the locking piece is in position within the collar bore.

The locking piece comprises means for releasably attaching the locking piece to the valve. In the specific embodiment of a refrigerant system, a threaded attachment portion typically exists beneath the valve access port that is used in current applications for filling the vessel. For this embodiment, then, the means of attaching comprises a threaded bore in the locking piece that is matable with the threaded portion of the valve.

The locking piece further comprises means for interfacing with a releasing tool for engaging and disengaging the locking piece from the valve. In actual practice, this interfacing means should be sufficiently inaccessible by commonly owned tools that tampering is discouraged. Therefore, a simple notch or "X" mark that could be manipulated with the use of a screwdriver would be inadvisable.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

A description of the preferred embodiment of the present invention will now be presented with reference to FIGS. 1–7.

The embodiment to be described herein is a safety cap for preventing unauthorized access to a refrigerant valve. The type of valve with which this embodiment is typically used is a Schrader valve, also known as a service or pump-down valve. Such valves are generally located in association with air conditioning systems in cars, houses, and commercial buildings.

Figure 1:
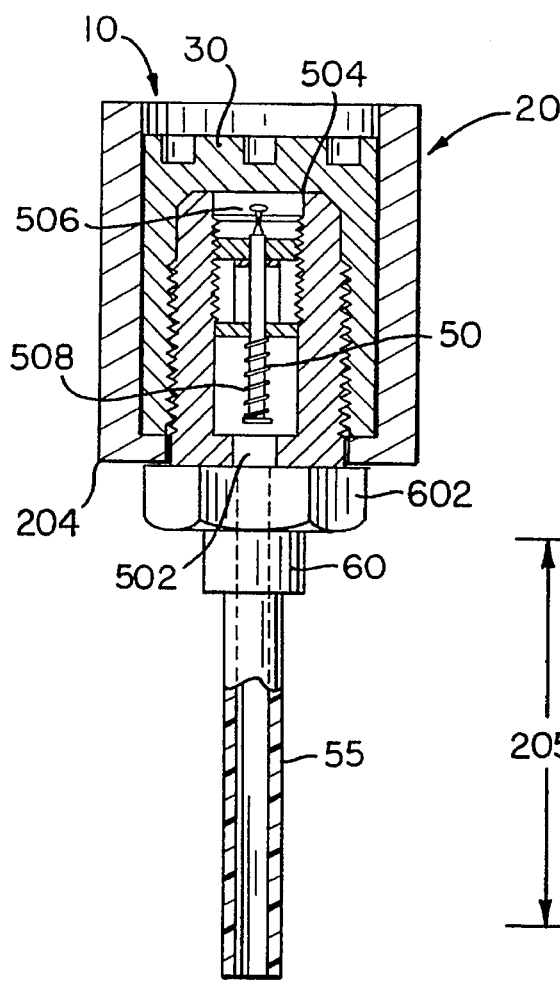
FIG. 1 is a side view of the safety cap in place on a refrigerant valve.
Figure 2:
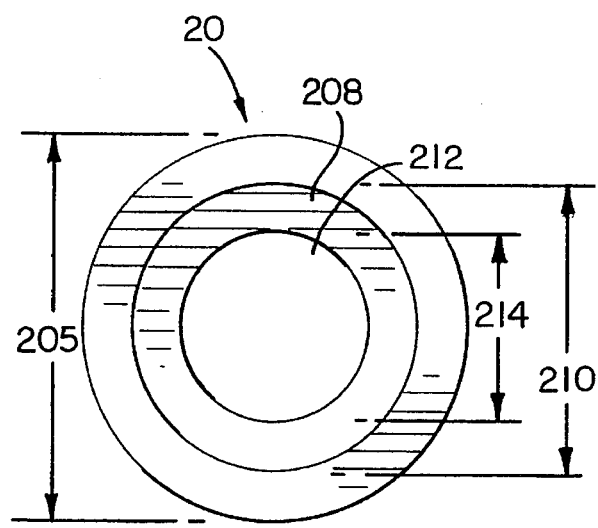
FIG. 2 is a top view of the safety cap collar.
Figure 3:
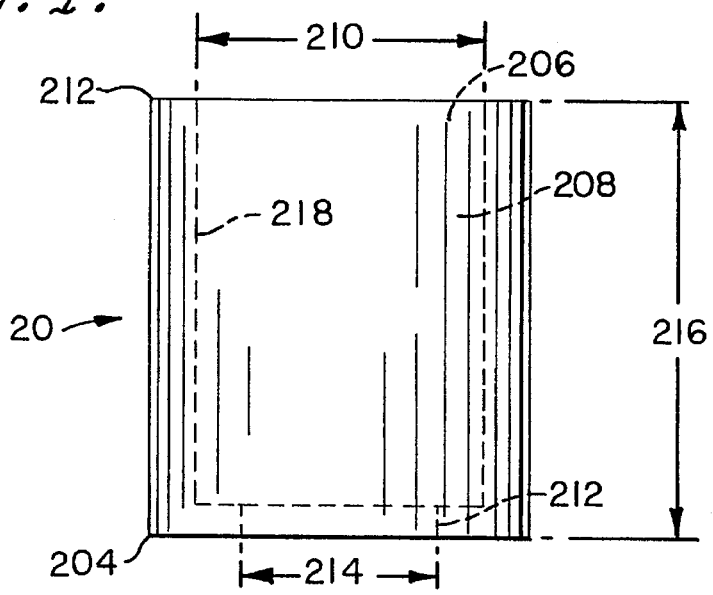
FIG. 3 is a side view of the safety cap collar.

A refrigerant valve 50 connected to a fluid line 55 is illustrated in FIG. 1 with the safety cap 10 of the present invention in place. As is typical, refrigerant valve 50 and fluid line 55 are connected via coupler 60, which has an upper portion 602 that is generally wider than the bottom 502 of the valve 50. An access port 504 (not shown in detail, as being of a type well known in the art) is located generally at the top 506 of the valve 50. Access to the valve 50 is achieved by screwing a connector onto a threaded attachment portion 508 located beneath the access port 504.

The safety cap 10 for protecting valve 50 comprises two elements: a collar 20 and a locking piece 30.

The collar 20 (see FIGS. 2 and 3), which is generally cylindrical and is preferably made of a hard material such as stainless steel to prevent tampering, has a top end 202, a bottom end 204, and means for retaining the collar 20 in surrounding relation to the valve's access port 504.

The collar 20 also has a bore 206 that exends from the top end 202 to the bottom end 204. The bore 206 has a top section 208 that has a diameter 210 and a bottom section 212 that has a diameter smaller than the top section diameter 210. The bore's bottom section diameter 214 is dimensioned sufficiently large to admit the valve 50 and yet is sufficiently small to prevent the collar 20 from passing beyond the coupler 60. Thus the bore's bottom section 212 serves as the retaining means. As can be seen in FIG. 1, the collar's bottom end 204 when in place rests against the upper portion 602 of the coupler 60.

The collar 20 further has a height 216 dimensioned so that the top end 202 extends above the access port 504, as shown in FIG. 1, which will be seen to enhance the protective function of the safety cap 10.

The second element, a generally cylindrical locking piece 30, is dimensioned to cover the valve access port 504 and to reside within the collar bore 206. The relative dimensioning and positioning of the two elements is designed so that the locking piece 30 is mechanically decoupled from the collar 20. In the embodiment described herein, the collar bore 206 is sufficiently large that the collar 20 can move freely with respect to the locking piece 30 when they are in place over a valve 50. This prevents an unauthorized person from disengaging the locking piece 30 from the valve 50 by manipulating (here, twisting) the collar 20.

The locking piece 30 has a top end 302, a top surface 312, a bottom end 304, a height 314, and an outer diameter 306. The outer diameter 306 is dimensioned sufficiently small to permit the locking piece 30 to pass into the collar bore top section 208 and yet sufficiently large to prevent passage into the collar bore bottom section 212.

Figure 4:
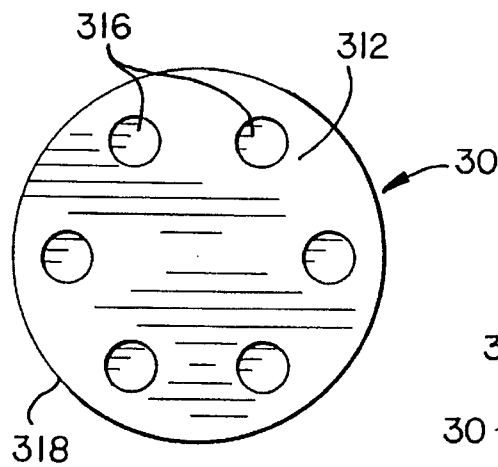
FIG. 4 is a top view of the safety cap locking piece.
Figure 5:
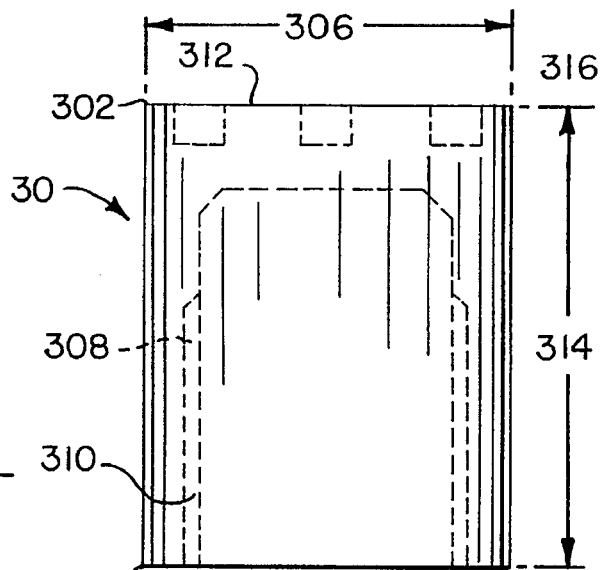
FIG. 5 is a side view of the safety cap locking piece.

In the preferred embodiment, as shown in FIGS. 4 and 5, the locking piece 30 also has a partial bore 308 that extends from the bottom end 304 and is dimensioned to surround the valve access port 504. A bottom portion 310 of the partial bore 308 is complementarily threaded for releasably mating with the valve threaded attachment portion 508. The threaded portions 508 and are positioned so that, when they are mated, the free movement between the collar 20 and the locking piece 30 is unimpeded but the collar 20 is still retained in position around the valve 50 and locking piece 30 (see FIG. 1).

The locking piece 30 further has means for interfacing with a releasing tool 40 for engaging and disengaging the locking piece from the valve 50. The interfacing means in the embodiment shown in FIGS. 4 and 5 comprises the top surface 312 of the locking piece 30 having a topographic feature for interfacing with the releasing tool 40, which is designed to have a complementary topographic feature. Thus in use twisting the releasing tool 40 when interfaced with the locking piece 30 in a first direction (normally clockwise) effects an engaging of the locking piece 30 with the valve threaded portion 508, and twisting in a second direction (normally counterclockwise) effects a disengaging of the locking piece 30 with the valve threaded portion 508.

Tampering is discouraged by three additional features of the safety cap 10: (1) The top surface 312 topographic feature is generally asymmetric, which makes it difficult to twist the locking piece 30 in the absence of a releasing tool 40; (2) the locking piece's height 314 is sufficiently small that the top surface is positioned beneath the collar's top end 202, which makes the top surface 312 difficult to access; and (3) the locking piece outer diameter 306 and the collar bore 206 are dimensioned sufficiently close to discourage tampering by an insertion of an object, such as a screwdriver, between the inner wall 218 of the collar bore 206 and the locking piece 30.

The topographic feature in the preferred embodiment shown in FIGS. 4 and 5 comprises a plurality (here, six) of unequally spaced holes 316 positioned circumferentially about the top surface 312. In this embodiment, the releasing tool 40, shown in FIGS. 6 and 7, has complementarily spaced and dimensioned protrusions 408. In use, then, the releasing tool 40 is inserted into the collar bore 206 from the top end 202 and the protrusions 408 are interfaced with the holes 316 to attach and release the locking piece 30 from the valve 50 via a twisting movement.

Figure 6:
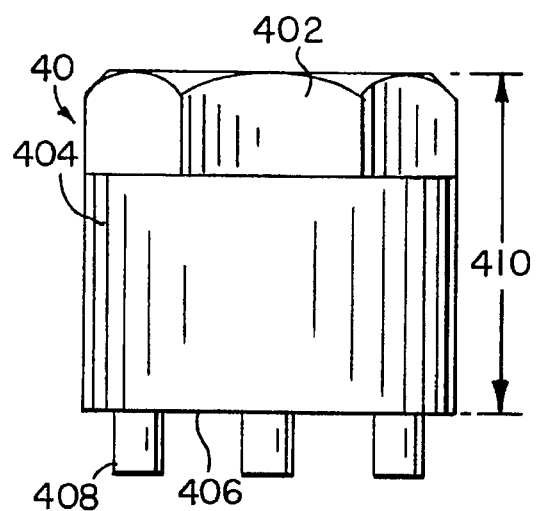
FIG. 6 is a side view of the releasing tool.

Yet two additional antitampering features lie in the material of the locking piece 30, which preferably comprises a material having a hardness generally less than that of steel, such as brass, and the positioning of the locking piece holes 316. As shown in FIG. 6, the holes 316 are positioned quite close to the periphery 318 of the top surface 312. This closeness is designed so that an attempt to tamper with the locking piece 30 in the absence of a releasing tool 40, such as by inserting a harder object like a screwdriver into the locking piece holes 316, will result in damage to the locking piece 30 without achieving a release of the locking piece 30 from the valve 50.

Figure 7:
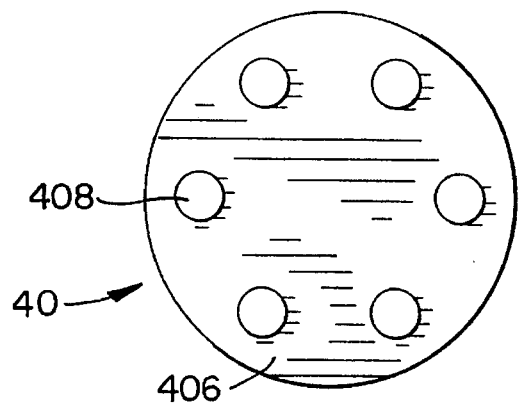
FIG. 7 is a bottom view of the releasing tool.

A system for preventing unauthorized access to a valve 50 comprises the safety cap 10 discussed above and a complementary releasing tool 40 such as shown in FIGS. 6 and 7. The releasing tool 40 has a top portion 402 for grasping and a bottom portion 404 dimensioned to fit within the collar bore top section 208. The complementary protrusions 408 extend from the bottom surface 406. The releasing tool 40 has a length 410 sufficient so that, when the tool 40 is interfaced with the locking piece 30, the top portion 402 extends sufficiently far above the collar top end 202 that it is graspable and twistable by the authorized user.

It may be appreciated by one skilled in the art that additional embodiments may be contemplated, including similarly conceived valves for other fluid applications.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A safety cap for preventing unauthorized access to a valve leading to a fluid storage vessel, the safety cap comprising:

a collar having:
means for retaining the collar in surrounding relation to an access port of the valve; and
a bore dimensioned to encompass the valve access port and further having a height dimensioned to extend thereabove; and a locking piece dimensioned to cover the valve access port and to reside within the collar bore, the locking piece mechanically decoupled from the collar, the locking piece comprising:
means for releasably attaching the locking piece to the valve; and
means for interfacing with a releasing tool for engaging and disengaging the locking piece from the valve.

2. The safety cap recited in claim 1, wherein the locking piece attaching means has a threaded bore matable with a threaded portion of the valve.

3. The safety cap recited in claim 2, wherein a bottom end of the collar bore is dimensioned sufficiently small to prevent a passage of the collar beyond a coupler affixed beneath the valve threaded portion, thereby, when in use, retaining the collar in surrounding relation to the valve access port.

4. The safety cap recited in claim 3, wherein a top surface of the locking piece has a topographic feature for interfacing with a releasing tool having a complementary topographic feature, wherein in use twisting the releasing tool when interfaced with the locking piece in a first direction effects an engaging of the locking piece with the valve threaded portion and twisting in a second direction effects a disengaging of the locking piece with the valve threaded portion.

5. The safety cap recited in claim 4, wherein the top surface topographic feature is generally asymmetric for discouraging tampering in the absence of a releasing tool.

6. The safety cap recited in claim 4, wherein the locking piece has a height sufficiently small that the top surface is positioned beneath a top end of the collar for discouraging tampering in the absence of a releasing tool.

7. The safety cap recited in claim 6, wherein the collar bore is sufficiently large that the collar can move freely with respect to the valve and the locking piece, thereby preventing a disengaging of the locking piece via a twisting of the collar.

8. A safety cap for preventing unauthorized access to a refrigerant valve having a threaded attachment portion generally beneath an access port, the valve in fluid communication with a refrigerant vessel via a coupler dimensioned larger than the threaded attachment portion, the safety cap comprising:
   a generally cylindrical collar having:
      a top end, a bottom end, and a height;
      a bore extending from the top end to the bottom end, the bore having a top section having a diameter and a bottom section having a diameter smaller than the top section diameter, the bottom section dimensioned sufficiently large to admit the valve and sufficiently small to prevent passage beyond the coupler;
   a generally cylindrical locking piece having:
      a partial bore extending from a bottom end, a bottom portion of the partial bore complementarily threaded for releasably mating with the valve threaded attachment portion, the partial bore dimensioned to surround the valve access port;
      an outer diameter dimensioned sufficiently small to permit passage into the collar bore top section and sufficiently large to prevent passage into the collar bore bottom section, the locking piece mechanically decoupled from the collar;
      a height generally smaller than a length of the collar bore top section, wherein a top surface of the locking piece is below the top end of the collar when positioned therein; and
      a plurality of unequally spaced holes positioned circumferentially about the top surface for interfacing with a releasing tool having complementarily spaced and dimensioned protrusions, wherein in use the releasing tool is inserted into the collar bore from the top end and the protrusions are interfaced with the holes to attach and release the locking piece from the valve via a twisting movement.

9. The safety cap recited in claim 8, wherein the locking piece comprises a material having a hardness generally less than a hardness of steel, and wherein the locking piece holes are positioned sufficiently close to a periphery of the top surface that an attempt to tamper with the locking piece in the absence of a releasing tool by inserting a harder object into the locking piece holes will result in damage to the locking piece without a release of the locking piece from the valve.

10. The safety cap recited in claim 9, wherein the locking piece comprises brass.

11. The safety cap recited in claim 8, wherein the locking piece outer diameter and the collar bore are dimensioned sufficiently different to permit free movement therebetween and further dimensioned sufficiently close to discourage tampering by an insertion of an object between an inner wall of the collar bore and the locking piece.

12. The safety cap recited in claim 11, wherein the collar comprises stainless steel.

13. A system for preventing unauthorized access to a valve leading to a fluid storage vessel, the system comprising:
   a releasing tool having a bottom portion; and
   a safety cap comprising:
      a collar having:
         means for retaining the collar in surrounding relation to an access port of the valve; and
         a bore dimensioned to encompass the valve access port and the releasing tool bottom portion and further having a height dimensioned to extend above the valve access port; and
      a locking piece dimensioned to cover the valve access port and to reside within the collar bore, the locking piece mechanically decoupled from the collar, the locking piece comprising:
         means for releasably attaching the locking piece to the valve; and
         means for interfacing with the releasing tool bottom portion for engaging and disengaging the locking piece from the valve.

14. The system recited in claim 13, wherein:
   the releasing tool has a plurality of protrusions extending downwardly from a bottom surface;
   the locking piece has a plurality of complementary holes in a top surface; and
   the interfacing means comprises mating the protrusions and holes.

* * * * *